United States Patent [19]

Holben

[11] Patent Number: 5,204,674
[45] Date of Patent: Apr. 20, 1993

[54] SERVO MECHANISM WITH DIFFERENTIAL PHASE SHIFT FEEDBACK

[75] Inventor: Daniel E. Holben, Haddonfield, N.J.

[73] Assignee: Conameter Corporation, Gibbsboro, N.J.

[21] Appl. No.: 783,364

[22] Filed: Oct. 28, 1991

[51] Int. Cl.$^5$ ............................................ G01R 27/26
[52] U.S. Cl. ............................ 340/870.25; 340/870.35; 340/870.37; 324/683; 324/677; 324/678
[58] Field of Search ............. 340/870.25, 870.35, 340/870.36, 870.37; 324/660, 661, 662, 677, 678, 683; 318/662

[56] References Cited

U.S. PATENT DOCUMENTS

| | | |
|---|---|---|
| 3,218,551 | 11/1965 | Cook . |
| 3,513,570 | 5/1970 | Pullen . |
| 3,532,955 | 10/1970 | Henegar . |
| 3,684,961 | 8/1972 | Muir ................................ 340/870.35 |
| 3,958,492 | 5/1976 | Curless . |
| 4,103,638 | 8/1978 | Fowler ................................ 324/678 |
| 4,142,144 | 2/1979 | Rohr . |
| 4,263,546 | 4/1981 | Morris . |
| 4,404,481 | 9/1983 | Ide ........................................ 324/678 |
| 4,470,008 | 9/1984 | Kato ...................................... 324/683 |
| 4,481,451 | 11/1984 | Kautz et al. . |
| 4,556,885 | 12/1985 | Kurosawa ...................... 340/870.25 |
| 4,584,885 | 4/1986 | Cadwell ......................... 340/870.37 |
| 4,636,792 | 1/1987 | Watson ........................... 340/870.37 |
| 4,817,498 | 4/1989 | Takagi . |
| 4,842,162 | 6/1989 | Merkel . |
| 5,049,824 | 9/1991 | Suzuki ................................ 324/660 |

Primary Examiner—Kenneth A. Wieder
Assistant Examiner—Jose M. Solis
Attorney, Agent, or Firm—Woodcock Washburn Kurtz Mackiewicz & Norris

[57] ABSTRACT

A position sensor which can be incorporated into a positional feedback-type servo mechanism includes a mechanical sensor element, an oscillator and first and second phase shifters, which in the disclosed embodiment are variable capacitors. The phase shifters are connected to the sensor element so as to increase and decrease, respectively, a phase shift of the signal generated by the oscillator as the sensor element moves in a given direction. A signal processing circuit converts the phase shifted signals into an output signal which is representative of the position of the sensor element.

11 Claims, 3 Drawing Sheets

MID-POINT

LEFT OF MIDPOINT

SERVO MECHANISM WITH DIFFERENTIAL PHASE SHIFT FEEDBACK

BACKGROUND OF THE INVENTION

1. Field of the Invention

This invention relates broadly to the field of sensors which are used to sense the position of an object, such as a positionable control element in an automated industrial process plant. More specifically, this invention relates to a positional feedback type servo mechanism for controlling a positionable element which is more precise, more durable, more adaptable to specialized applications and less affected by environmental factors than positioners which have commonly been used in the past.

2. Description of the Prior Art

Servo mechanisms for controlling various system components such as valves, variable pitch fans, variable stroke pumps and other components are in common use throughout industry, both in the United States and throughout the world.

In such mechanisms, a feedback signal proportional to the position of the control element of the system component is detected, and power is directed to an actuator to bring the actuator and, thus the control element, to a desired position. In an electrical servo mechanism, the feedback signal which represents the position of the final control element is most commonly derived from the position of a slide wire on a potentiometer. Most often, the servo mechanism includes a comparator which compares the feedback signal to an input signal which is representative of the desired position of the final control element. This input signal can be generated by a manually adjustable component, or by a central control system, the latter arrangement becoming more common as industry progresses toward automation. The comparator generates an error signal which is proportional to the magnitude of the difference between the feedback signal and the input signal. This error signal is amplified, and is ultimately utilized to direct the actuator to bring the final control element to the position which is specified by the input signal.

In the past, industrial process control systems have often relied on pneumatically signalled and controlled servo mechanisms to control process variables within the system. As time passes, however, pneumatically signalled positioners are being replaced by electrically signalled positioners in ever increasing numbers because of the higher signal transmission speed and compatibility to centralized computers. Electrically signalled positioners through use of the greater accuracy of digital signal processing, can achieve a higher degree of process accuracy.

Even as the use of electrically signalled positioners increases, it is becoming increasingly apparent that there are inherent limitations in the use of a potentiometer to generate the position feedback signal. As a result of the physical nature of its construction, the resistance of a potentiometer is not continuously variable throughout its range, which limits the sensitivity of a potentiometer based positioner. In addition, the wiper element of a potentiometer tends to wear after continued use, affecting the resistance characteristics of the potentiometer and thus the accuracy of the positioner. The motion of the wiper on the resistive element of the potentiometer can also generate noise in the positioning circuit, which can be detrimental to the circuit and to the control system in general. Furthermore, the wiper motion and thus the signal generated in relation to the actual position is usually linear and is difficult to nonlinearly characterize.

It is clear that there has existed a long and unfilled need in the prior art for an electrically signaled positioner which can be used in an servo mechanism for controlling the position of an element which is more precise, more resistant to wear, more resistant to interference from environmental factors, and which can be characterized to represent a particular positional control profile for an element which is being controlled.

SUMMARY OF THE INVENTION

Accordingly, it is an object of the invention to provide an electrically signaled positioner for a servo mechanism which is more resistant to environmental interference than positioners heretofore known.

It is further an object of the invention to provide an electrically signaled positioner which provides a continuous, noise free signal which is indicative of the position of a control element or other object.

It is yet further an object of the invention to provide an electrically signaled positioner which can be constructed so as to characterize a particular position control profile for a final control element such as a valve.

It is also an object of the invention to provide an electrically signaled positioner which is less susceptible to wear and has a longer design life before failure than systems heretofore known.

To achieve the above and other objects of the invention, an apparatus according to one aspect of the invention for sensing the position of a moveable object such as an actuator member in an industrial processing facility includes a mechanical sensor element; an oscillator for generating a reference signal which includes a series of pulses at a constant frequency; a first phase shifter for shifting the phase of the reference signal in response to movement of the sensor element to create a first phase shifted signal, the first phase shifter being constructed so that the magnitude of phase shift between the reference signal and the first phase shifted signal increases upon movement of the sensor element in a first direction; a second phase shifter for shifting the phase of the reference signal in response to movement of the sensor element to create a second phase shifted signal, the second phase shifter being constructed so that the magnitude of phase shift between the reference signal and the second phase shifted signal increases upon movement of the sensor element in a second direction which is opposite to the first direction; and a processor for processing the first and second phase shifted signals into a non-oscillating signal having a value which is representative of the position of the sensor element, whereby the position of the sensor element can be accurately determined with minimal interference from component wear.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
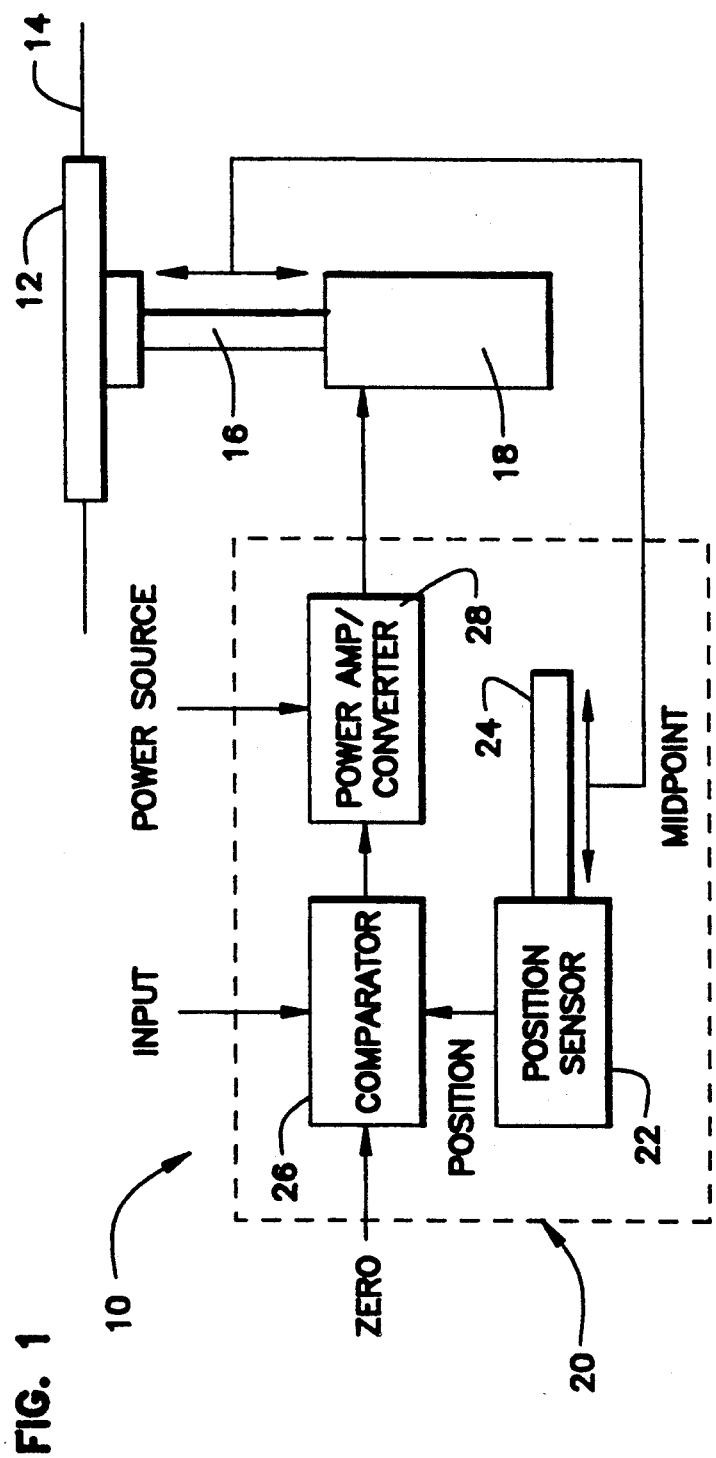
FIG. 1 is a schematic diagram of a system according to a preferred embodiment of the invention.

Referring now to the drawings, wherein like reference numerals designate corresponding structure throughout the views, and referring in particular to FIG. 1, a system 10 as may be found in a chemical processing plant includes one or more final control elements such as a valve 12, which is positioned to control the flow of fluid within a fluid line 14. As is shown in FIG. 1, valve 12 can be variably controlled by an actuator member 16, which is positionally controlled by an actuator 18. Actuator 18 could be one of many proportional-type actuator which are commercially available. Preferably, actuator 18 is a series E or P rotary actuator manufactured by El-O-Matic U.S.A., Inc., of Hackensack, N.J.

Referring again to FIG. 1, the system 10 further includes a servo mechanism 20 for simultaneously monitoring the position of the actuator member 16, and controlling the actuator 18 so that the position of actuator member 16 is kept within a predetermined positional range. Servo mechanism 20 includes a novel position sensor 22 which has a mechanical sensor element 24 that is mechanically connected to move in response to movement of the actuator member 16. This linkage is schematically depicted in FIG. 1. Servo mechanism 20 further includes a comparator 26, and a power amplifier/converter 28. Comparator 26 is of conventional design, and is constructed to receive a position signal input from the position sensor 22, and a control input signal from which represents the desired position of actuator member 16.

As will be described in greater detail below, the comparator 26 compares the positional input signal with the control input signal, and determines whether the actuator member 16 is in the position specified by the control input signal. If the actuator member 16 is in a position which is different from that specified by the control input signal, an error signal is created by the comparator 26 and is transmitted to the power amplifier/converter. The amplifier/converter 28 amplifies the error signal by a power source which is sufficient to drive the actuator 18. The power source input to power amplifier/converter 28 can be electrical, pneumatic, hydraulic or any other type of power input. Thus amplified, the error signal instructs the actuator 18 to move the actuator member 16 to the position which is indicated by the control input signal. Comparator 26 and power amplifier/converter 28 are preferably of conventional design.

Figure 2:
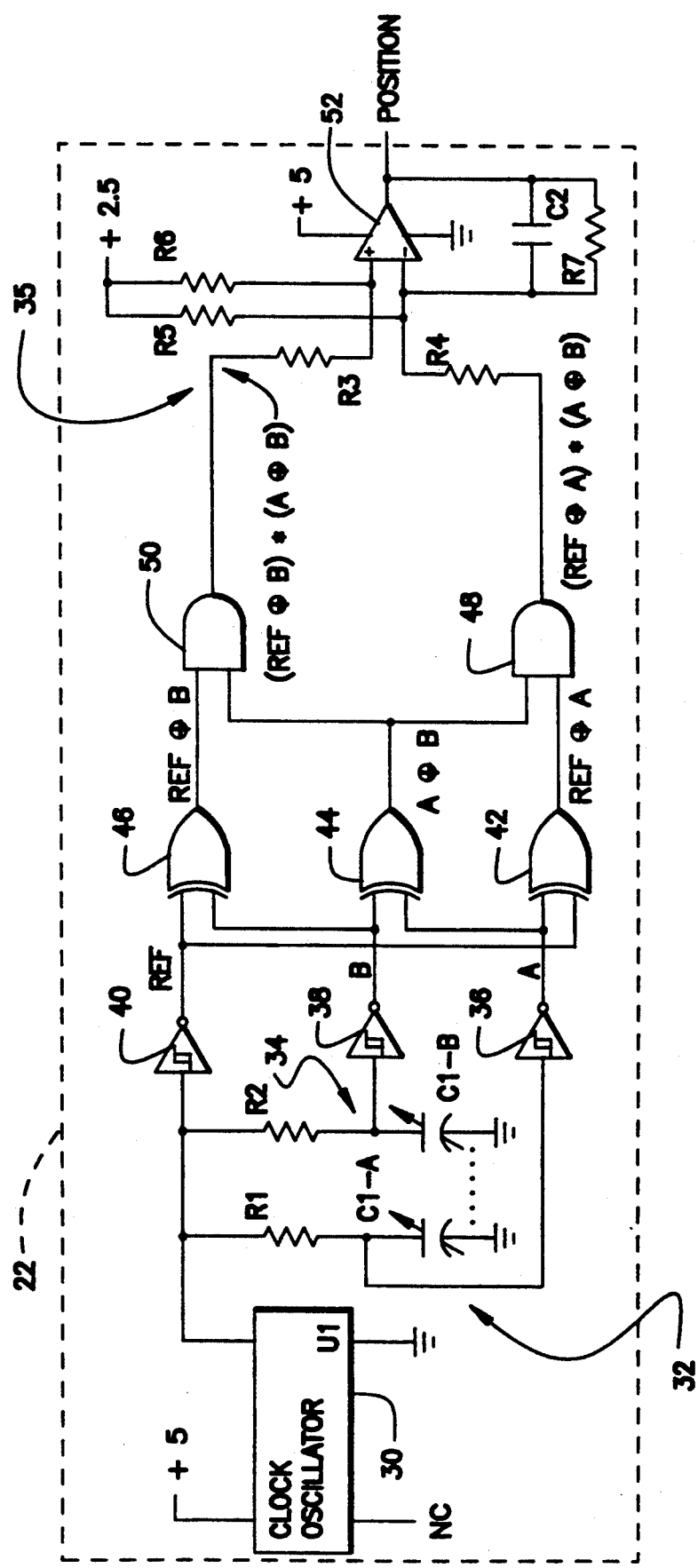
FIG. 2 is a schematic diagram of a component of the system which is depicted in FIG. 1.

Looking now to FIG. 2, the novel construction of position sensor 22 includes an oscillator 30 which is adapted for generating a reference signal which includes a series of pulses at a constant frequency. Preferably, oscillator 30 produces a constant frequency signal which has the profile of a square wave. As is shown in FIG. 2, position sensor 22 further includes a pair of variable capacitors C1-A and C1-B, which are linked mechanically for common actuation in such a manner that the capacitance of C1-B will decrease as the capacitance of C1-A increases, and the capacitance of C1-B will increase as the capacitance of C1-A decreases. Capacitors C1-A, C1-B are mechanically linked to the mechanical sensor element 24 in such a manner that their respective capacitances will vary according to the position of the mechanical sensor element 24. As will be discussed in greater detail below, capacitors C1-A, C1-B can be constructed to have a non-linear profile of capacitance in response to movement of the mechanical sensor element 24. By varying the capacitance profile of the respective capacitors C1-A, C1-B, the position sensor 22 can be customized to the individual response characteristics of a final control element such as valve 12. For example, C1-A and C1-B could be profiled so as to compensate for the non-linear characteristics of the fluid flow through valve 12. Other types of final control elements could also have non-linear response characteristics, as will be appreciated by those persons who are skilled in the art.

Referring again to FIG. 2, it will be seen that a first phase shifting system 32 and a second phase shifting system 34 are constructed as opposite sides of a Wheatstone bridge circuit which are defined by variable capacitors C1-A, C1-B and a pair of fixed value resistors R1 and R2. Alternatively, the first and second phase shifting systems 32, 34 could utilize inductors rather than capacitors, as will be appreciated by those skilled in the art. The first phase shifting system 32 constitutes variable capacitor C1-A and resistor R1, while the second phase shifting system constitutes variable capacitor C1-B and resistor R2.

As may be seen in FIG. 2, the juncture between variable capacitors C1-A and fixed value resistor R1 is electrically connected to a first inverter 36, which has a Schmitt trigger input. Likewise, the juncture between variable capacitor C1-B and fixed value resistor R2 is electrically connected to an inverter 38 which also has a Schmitt trigger input. The signal from oscillator 30 is directly connected to a third inverter 40, which also has a Schmitt trigger input.

As is indicated schematically in FIG. 2, position sensor 22 includes a signal processing system 35 having a first logical EXCLUSIVE OR gate 42, a second logical EXCLUSIVE OR gate 44, and a third logical EXCLUSIVE OR gate 46. The first EXCLUSIVE OR gate 42 is connected to receive input from the first inverter 36 and the third inverter 40. The second EXCLUSIVE OR gate 44 is connected to receive input from the first inverter 36 and the second inverter 38. The third EXCLUSIVE OR gate 36 is connected to receive input from the second inverter 38 and the third inverter 40. The specific purpose of EXCLUSIVE OR gates 42, 44, 46 will be described in greater detail with reference to the system operation below.

Position sensor 22 further includes a first logical AND gate 48 and a second logical AND gate 50. The first AND gate 48 is connected to receive input from the first EXCLUSIVE OR gate 42 and the second EXCLUSIVE OR gate 44. The second AND gate 50 is connected to receive input from the second EXCLUSIVE OR gate 44 and the third EXCLUSIVE OR gate 46. The outputs of the first AND gate 48 and the second AND gate 50 are connected to an integrator 52. Alternatively, the digital signals from the two AND gates 48, 50 could be applied to a microprocessor-based digital circuit which would evaluate the signals and derive a digital or numeric output indicating position. Specifically, the output from first AND gate 48 is connected to a terminal of integrator 52 which is the inverting input, and the output of second AND gate 50 is connected to a terminal of integrator 52 which is the non-inverting input. Integrator 52 produces an output POSITION signal, which is fed to the comparator 26. Preferably, the signal processing system 35 is constructed so that integrator 52 does not receive input from the first and second AND gates 48, 50 at the same time. When integrator 52 receives a signal from first AND gate 48 the POSITION signal is ordinarily negative. When integrator 52 receives a signal from second AND gate 50, the POSITION signal is ordinarily positive. However, to accommodate a particular comparator 26, the input to integrator 52 can be biased so that a given output voltage or current represents the neutral position.

In operation, the mechanical sensor element 24, and thus the capacitors C1-A, C1-B, can be positioned at a midpoint position, at a position which is to the left of the midpoint as is depicted in FIG. 1, or to a position which is to the right of the midpoint, as is shown in FIG. 1. Alternatively, mechanical sensor element 24 may be of the rotary type, where the possible positions are midpoint, clockwise from midpoint, or counterclockwise from midpoint. If the sensor element 24 is positioned at midpoint, by definition, the capacitance of variable capacitor C1-A will be equal to that of variable capacitor C1-B. Accordingly, the degree of phase shift which is created by the first phase shifting system 32 will be equal to that which is created by the second phase shifting system 34.

Figure 3A:
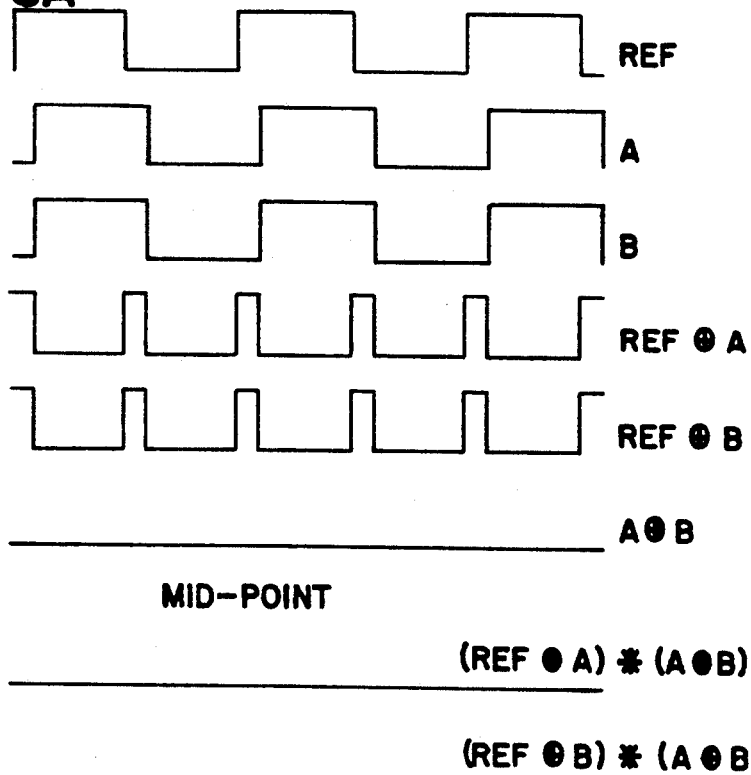
FIGS. 3(a) and 3(b) are signal diagrams depicting the performance of the system which is illustrated in FIGS. 1 and 2.

Accordingly, at the midpoint position, a signal which has been shifted in phase from the output of oscillator 30 is created at the juncture between C1-A and fixed resistor R1. An identical phase shifted signal is created at the juncture between capacitor C1-B and fixed resistor R2. The former signal is received by first inverter 36, which includes a Schmitt trigger to inject a measure of hysteresis into the signal prior to inversion. The hysteresis reduces unwanted signal shifting which might otherwise occur at the critical transition point which the inverter uses to differentiate between a logical one or a logical zero output. Similarly, the phase shifted signal from the juncture between C1-B and R2 is fed to second inverter 38, which also includes a Schmitt trigger for inducing hysteresis. The signal from the oscillator 30 is fed directly to the third inverter 40, which also includes a Schmitt trigger. FIG. 3(a) depicts the waveforms and degrees of phase shift of a signal REF which represents the output of third inverter 40, a signal A which represents the output of first inverter 36, and a signal B, which represents the output of second inverter 38. As can be seen in FIG. 3(a), signal A is phase shifted to the same degree as signal B at the midpoint position. Both signals A and B are slightly delayed in phase with respect to signal REF due to the phase shift which is induced by the first phase shifting system 32 and the second phase system 34, respectively.

An EXCLUSIVE OR gate is constructed so that it will give an output equal to a logical "one" when the two signals which are applied to it have different values. For example, an EXCLUSIVE OR gate will give a logical one output if a first input has a value of logical zero and the second input has a value of logical one. However, an EXCLUSIVE OR gate will have an output of logical zero if the two inputs both have a logical value of zero or one.

The first EXCLUSIVE OR gate 42 receives input from signals REF and A, and creates an output signal REF⊕A. Second EXCLUSIVE OR gate 44 receives input from signals A and B, and emits an output of signal A⊕B. Third EXCLUSIVE OR gate 46 receives signals REF and B as input, and emits an output signal REF⊕B. As can be seen in FIG. 3(a), signals REF⊕A and REF⊕B have pulse widths of equal width when sensor element 24 is at the midpoint position. At the midpoint position, signal A⊕B has a constant value of logical zero. An AND gate is constructed so that it emits an output equal to a logical one if logical one values are indicated by both input signals. If the input signals are not both equal to a logical one, the output of an AND gate will be equal to a logical zero. First AND gate 48 receives signals REF⊕A and A⊕B as input, and has an output signal (REF⊕A)*(A⊕B). Second AND gate 50 has an input of A⊕B and REF⊕B, and emits an output of (REF⊕B)*(A⊕B). At the midpoint position, it will be seen that both signals (REF⊕A)*(A⊕B) and (REF⊕B)*(A⊕B) have a waveform which is equal to a constant value of logical zero, or a null output. Thus, when integrated by integrator 52, no additional signal is superimposed upon the voltage or current biasing which is already applied to integrator 52. As a result, the POSITION signal sent to comparator 26 will be equal to the biasing provided to integrator 52, indicating a position value as zero or midpoint. The comparator 26 will compare this value to the value of the input signal, and determine whether the desired position of actuator member 16 corresponds to the midpoint position of mechanical sensor element 24. If it does, no error signal will be generated, and power amplifier/converter 28 will not be instructed to drive the actuator 18. If the input signal to comparator 26 indicates that the indicated position for actuator member 16 does not correspond to the midpoint of sensor element 24, an error signal will be generated, and sent onto amplifier/converter 28. Power amplifier/converter 28 will amplify the error signal and provide the amplified error signal as input to actuator 18, which will drive actuator member 16 to the indicated position.

Figure 3B:
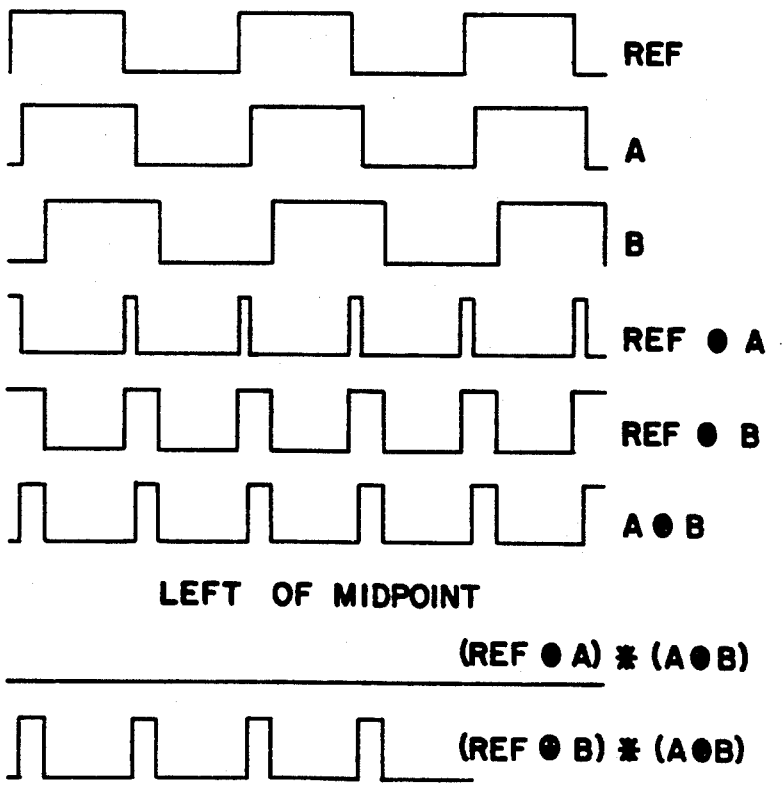

FIG. 3(b) indicates the respective signal profiles which are generated by the system 35 when the mechanical sensor element 24 moves to a position which is to one side, for example, to the left, of midpoint. In this position, signal A will be phase shifted with respect to signal REF to a lesser degree than signal B is shifted with respect to signal REF, because in this position the capacitance of C1-B will be greater than that of C1-A. Since signal B is phase shifted to a greater degree than is signal A, signal REF⊕B will have a broader pulse width than will signal REF⊕A. Signal A⊕B will have pulses which have a pulse width which corresponds to the phase difference between signals A and B. Thus, signal A⊕B will have a pulse width which is indicative of the distance to which sensor element 24 has been shifted from midpoint.

Regardless of the magnitude of distance by which sensor element 24 is shifted from midpoint, signals REF⊕A and A⊕B will never be at a logical one simultaneously at a particular point in time. Accordingly, the output (REF⊕A)*(A⊕B) from first AND gate 48 will always be at a continuous logical zero value as long as the sensor element 24 remains to the left of midpoint. Conversely, the logical one pulses of signals REF⊕B and A⊕B will always superimpose to a certain extent, and both will have increased pulse widths as sensor element 24 moves farther from the midpoint position. Accordingly, signal (REF⊕B)*(A⊕B) will have a pulse width which is proportionate to the degree of displacement of the sensor element 24 from midpoint. If the capacitors C1-A, C1-B have a linear capacitance profile, the pulse width of signal (REF⊕B)*(A⊕B) will increase linearly in relation to displacement of the sensor element 24. If the capacitors C1-A, C1-B have a non-linear profile for the purposes which have previously been discussed, the output signal from AND gate 50 would likewise be nonlinear With respect to the position of sensor element 24.

Accordingly, signal (REF⊕B)*(A⊕B) is processed by integrator 52 into a voltage output which has a magnitude proportional to the pulse width of that signal. The magnitude of this output signal is thus indicative of the position of sensor element 24. The signal is superimposed upon the biasing which is provided to integrator 52 to create the POSITION signal which is supplied to comparator 26.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for sensing the position of a movable object such as an actuator member in an industrial processing facility, comprising:
   a mechanical sensor element;
   an oscillator for generating an oscillating reference signal;
   first phase shifting means for shifting the phase of said reference signal in response to movement of said sensor element to create a first phase-shifted signal, said first phase shifting means being constructed so that the magnitude of phase shift between said reference signal and said first phase-shifted signal increases upon movement of said sensor element in a first direction;
   second phase shifting means for shifting the phase of said reference signal in response to movement of said sensor element to create a second phase-shifted signal, said second phase shifting means being constructed so that the magnitude of phase shift between said reference signal and said second phase-shifted signal increases upon movement of said sensor element in a second direction which is opposite to the first direction; and
   processing means for processing said first and second phase-shifted signals into first and second processed signals which, together, are representative of the position of said sensor element, said processing means being constructed and arranged so that said first processed signal is steady while said second processed signal pulses when said sensor element is to one side of a threshold position, and said first processed signal is pulsed while said second processed signal is steady when said sensor element is positioned to a second, opposite side of the threshold position, the use of said first and second phase-shifting means permitting position detection with minimal interference from component wear and the various environmental factors that tend to affect resistance-bases sensors.

2. An apparatus according to claim 1, wherein said first and second phase-shifting means comprise a pair of variable capacitors which are mechanically coupled to said sensor element for common actuation.

3. An apparatus according to claim 1, wherein said processing means further comprises an integrator for converting said first and second pulsed signals to a non-oscillating signal that is representative of the position of the sensor element.

4. An apparatus according to claim 1, wherein said processing means is constructed so that said first pulsed signal is zero and said second pulsed signal is non-zero when said first phase-shifted signal has a magnitude of phase-shift which is less than the magnitude of phase shift of said second phase shifted signal; and so that said first pulsed signal is non-zero and said second pulsed signal is zero when said first phase-shifted signal has a magnitude of phase shift which is greater than the magnitude of phase shift of said second phase shifted signal, whereby only one of said pulsed signals is passed on to the integrator at one time.

5. An apparatus according to claim 3, wherein said integrator is connected to said first and second pulsed signal producing means so that an input to said integrator from said first pulsed signal is processed by said integrator into a positive going voltage signal, and an input to said integrator from said second pulsed signal is processed by said integrator into a negative going voltage signal.

6. An apparatus according to claim 1, wherein said signal produced by said processing means has a voltage which is representative of the position of the sensor element.

7. An apparatus according to claim 1, wherein said processing means comprises first pulsed signal producing means comprising a first "EXCLUSIVE OR" gate connected to receive said reference signal and said first phase-shifted signal; a second "EXCLUSIVE OR" gate connected to receive said first phase-shifted signal and said second phase-shifted signal; and a first "AND" gate connected to receive the outputs from said first and second "EXCLUSIVE OR" gates.

8. An apparatus according to claim 1, wherein said processing means comprises second pulsed signal producing means comprising a third "EXCLUSIVE OR" gate connected to receive said reference signal and said second phase-shifted signal; and a second "AND" gate connected to receive the outputs from said second and third "EXCLUSIVE OR" gates.

9. An apparatus according to claim 1, further comprising means for introducing a hysteresis into at least one of said reference signal, said first phase-shifted signal and said second phase-shifted signal.

10. An apparatus according to claim 9, wherein said hysteresis introducing means comprises a Schmitt trigger.

11. An apparatus for sensing the position of a movable object such as an actuator member in an industrial processing facility, comprising:
    a mechanical sensor element;
    an oscillator for generating an oscillating reference signal;
    a first phase shifter for shifting the phase of said reference signal in response to movement of said sensor element to create a first phase-shifted signal, said first phase shifter being constructed so that the magnitude of phase shift between said reference signal and said first phase-shifted signal increases upon movement of said sensor element in a first direction;

a second phase shifter for shifting the phase of said reference signal in response to movement of said sensor element to create a second phase-shifted signal, said second phase shifting means being constructed so that the magnitude of phase shift between said reference signal and said second phase-shifted signal increases upon movement of said sensor element in a second direction which is opposite to the first direction; and a processor for processing said first and second phase-shifted signals into first and second processed signals which, together, are representative of the position of said sensor element, said processor being constructed and arranged so that said first processed signal is steady while said second processed signal pulses when said sensor element is to one side of a threshold position, and said first processed signal is pulsed while said second processed signal is steady when said sensor element is positioned to a second, opposite side of the threshold position, the use of said first and second phase-shifters permitting position detection with minimal interference from component wear and the various environmental factors that tend to affect resistance-based sensors.

* * * * *